(12) United States Patent
Tokuyasu et al.

(10) Patent No.: US 6,734,239 B1
(45) Date of Patent: May 11, 2004

(54) FLAME RETARDANTS FOR RESINS AND FLAME-RETARDED RESIN COMPOSITIONS CONTAINING THE SAME

(75) Inventors: Noriaki Tokuyasu, Tokai (JP); Katumi Kameda, Chita (JP)

(73) Assignee: Daihachi Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 09/926,826

(22) PCT Filed: Jun. 19, 2000

(86) PCT No.: PCT/JP00/04004

§ 371 (c)(1),
(2), (4) Date: Dec. 27, 2001

(87) PCT Pub. No.: WO01/04204

PCT Pub. Date: Jan. 18, 2001

(30) Foreign Application Priority Data

Jul. 9, 1999 (JP) ............................. 11/195958

(51) Int. Cl.$^7$ ................................. C08K 5/527
(52) U.S. Cl. ....................... 524/116; 524/117
(58) Field of Search ................. 524/116, 117; 558/82–83

(56) References Cited

U.S. PATENT DOCUMENTS

| | | | |
|---|---|---|---|
| 2,859,086 A | * 11/1958 | Feild et al. ............ | 8/584 |
| 4,049,617 A | 9/1977 | Albright .............. | 524/117 |
| 5,401,788 A | 3/1995 | Tokuyasu et al. ..... | 524/119 |
| 5,750,601 A | 5/1998 | Staendeke ............ | 524/117 |
| 5,852,197 A | 12/1998 | Staendeke ............ | 524/117 |
| 6,462,112 B2 | 10/2002 | Otsuki .............. | 524/124 |

FOREIGN PATENT DOCUMENTS

| | | |
|---|---|---|
| EP | 0617042 | 9/1994 |
| EP | 0754724 | 1/1997 |
| EP | 0779294 | 6/1997 |
| EP | 0779332 | 6/1997 |
| JP | 52-89685 | 7/1977 |
| JP | 63-95249 | 4/1988 |
| JP | 6-321974 | 1/1994 |
| JP | 9-176376 | 7/1997 |

OTHER PUBLICATIONS

English Language Abstract of JP 9–176376.
English Language Abstract of JP 6–321974.
English Language Abstract of JP 63–95249.

* cited by examiner

*Primary Examiner*—Peter Szekely
(74) *Attorney, Agent, or Firm*—Greenblum & Bernstein, P.L.C.

(57) ABSTRACT

Flame retardants for resins, which contain as the principal component phosphorinane-type phosphates represented by general formula (I) (wherein $R_1$ and $R_2$ are each independently $C_1$–$C_6$ alkyl; and $R_3$ is $C_1$–$C_{20}$ alkyl), and which can impart excellent flame retardance to resins without lowering in the physical properties inherent in the resins and are excellent in resistance to hydrolysis and free from halogen; and flame-retarded resin compositions excellent in mechanical characteristics.

14 Claims, No Drawings

FLAME RETARDANTS FOR RESINS AND FLAME-RETARDED RESIN COMPOSITIONS CONTAINING THE SAME

BACKGROUND OF THE INVENTION

1. Field of the Invention

The present invention relates to a flame retardant for resins containing as a main component a phosphoric ester having a phosphorinane structure, and a flame-retarded resin composition containing the ester.

2. Description of Background Information

Thermoplastic resins such as polypropylene, polystyrene or acrylonitrile-butadiene-styrene (ABS) resin, etc. and thermosetting resins such as polyurethane or phenolic resin, etc. can be produced at relatively low costs and have excellent characteristics such as capability of being easily molded. For this reason, these resins are generally used for a wide variety of everyday articles including electronic components and automobile components.

Since the resins themselves are easy to flame, the resins easily burn out once the resins catch fire. Fires especially at public facilities such as electric or communications cables may have serious effects on social functions. Today, flame-retardation is legally demanded with regard to some fields where resins are used such as fields of electric appliances, automobile interiors, textile products, etc. As such flame-retardation regulations, are known the UL standards for electric appliances in the United State, FMVSS-302 regarding automobiles and the like.

In order to provide flame retardant properties to resins, the process of adding flame retardants for resins (referred to as flame retardants hereinafter) during preparation of resin compositions for molding is generally adopted. Such flame retardants include inorganic compounds, organic phosphorus compounds, organic halogen compounds, halogen-containing organic phosphorus compounds and the like.

Of the above-mentioned compounds, the organic halogen compounds and halogen-containing organic phosphorus compounds exhibit an excellent flame retardant effect. However, these compounds containing halogen generate hydrogen halide by thermal decomposition during the molding of resins. That will cause problems such as corrosion of mold dies, deterioration of resins and coloring of resins. Further, hydrogen halide worsens work environment because of its toxicity. In addition to that, the halogen-containing compounds adversely affect human bodies by generating toxic gases such as hydrogen halide and dioxins during burning, for example, in fires.

It is generally considered that coloring which takes place in the molding of resins is caused by phosphoric acid or hydrogen chloride generated by dehalogenation reaction and an amine-hydrochloride generated in the co-presence of an amine.

Flame retardants not containing halogens include inorganic compounds such as magnesium hydroxide, aluminum hydroxide, calcium hydroxide, etc. However, these inorganic compounds have only significantly poor flame retardant effects. Consequently, it is necessary to add these compounds in a large amount for obtaining a sufficient flame retardant effect. Thereby, intrinsic properties of resins, especially mechanical properties of molded articles of resins may be impaired.

Therefore, is strongly demanded the development of a flame retardant which does not contain any halogen and is free of the above-described drawbacks.

U.S. Pat. No. 5,750,601 discloses 5,5-dimethyl-2-oxo-2-phenoxy-1,3,2-dioxaphosphorinane as a flame retardant not containing a halogen.

However, this compound is solid within the range of room temperature to temperatures at which resins are molded. Therefore, it is difficult to mix the compound with resin materials or to disperse the compound uniformly into the resin materials. For example, a polyurethane foam is obtained by condensation reaction of a diisocyanate with a polyol in which a solid flame retardant is dispersed beforehand. A problem lies in that the flame retardant settles and does not uniformly disperse in the polyol. Also, since the flame retardant is solid, it is difficult to add the flame retardant in a constant amount automatically and handle the flame retardant when the flame retardant is added to a resin material during the preparation of a resin composition for molding.

BRIEF DESCRIPTION OF THE INVENTION

The present invention is to solve the drawbacks of the prior-art techniques as described above, and an object of the present invention is to provide a flame retardant not containing a halogen which, when added to various kinds of resins, gives excellent flame retardancy to the resins without declining the intrinsic properties of the resins and which has a good resistance to hydrolysis, and a flame-retarded resin composition having excellent mechanical properties.

As a result of intensive study to solve the above problems, the inventors have found the blending of a specific phosphoric ester with a resin, and have accomplished the present invention.

Of the phosphoric esters represented by the formula (I) of the present invention, a compound having methyl groups as $R_1$ and $R_2$ and a methyl group as $R_3$ is known, for example, as a lubricating oil component, but has been found to have an unexpectedly excellent effect when used as a flame retardant.

Accordingly, the present invention provides a flame retardant for resins containing a phosphoric ester (referred to as "phosphoric ester (I)" hereinafter) represented by the formula (I):

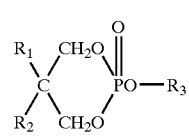

(I)

wherein $R_1$ and $R_2$, the same or different, are an alkyl group having a carbon number of 1 to 6 and $R_3$ is an alkyl group having a carbon number of 1 to 20.

Also, according to the present invention, there is provided a flame-retarded resin composition (referred to as "a resin composition" hereinafter) containing the above-mentioned flame retardant as a flame retardant in a resin.

DETAILED DESCRIPTION OF THE INVENTION

The phosphoric ester contained in the flame retardant of the present invention is represented by the aforesaid formula (I).

In the formula (I), as alkyl groups of $R_1$ and $R_2$ having a carbon number of 1 to 6, straight-chain or branched alkyl groups may be mentioned, examples of which include straight-chain alkyl groups such as methyl, ethyl, n-propyl, n-butyl, n-pentyl, n-hexyl, etc., and branched alkyl groups such as iso-propyl, iso-butyl, sec-butyl, tert-butyl, iso-pentyl, tert-pentyl, neo-pentyl, iso-hexyl, etc. Among these groups, straight-chain or branched alkyl groups having a carbon number of 1 to 4 are preferable, and methyl is the most preferable.

As alkyl groups of $R_3$ having a carbon number of 1 to 20, straight-chain or branched alkyl groups may be mentioned, among which alkyl groups having a carbon number of 1 to 18 are preferable. Examples thereof include straight-chain alkyl groups such as n-heptyl, n-octyl, n-nonyl, n-decyl, n-dodecyl, n-tetradecyl, n-hexadecyl, n-octadecyl, etc., and branched alkyl groups such as methylhexyl, methylheptyl, 2-ethylhexyl, iso-decyl, iso-dodecyl, iso-tetradecyl, iso-hexadecyl, iso-octadecyl, etc., as well as the alkyl groups mentioned above as examples of $R_1$ and $R_2$. Among these groups, straight-chain or branched lower alkyl groups having a carbon number of 1 to 4 are preferable, and n-propyl and n-butyl are the most preferable.

Phosphoric esters (I) wherein $R_3$ is a lower alkyl group are liquid at ordinary temperature and have a low viscosity (15 to 40 cps/25° C.). They have suitable properties for flame retardants.

As examples of the phosphoric esters (I), the compounds described in Production Examples 1 and 2 may be mentioned.

The phosphoric esters (I) of the present invention might contain impurities derived from by-products and unreacted materials during production, but may be used as flame retardants without being further purified so long as the impurities do not affect the thermal resistance and the flame retardancy of resin compositions.

The flame retardant of the present invention may be a mixture of two or more species of phosphoric esters (I).

The resin composition of the present invention contains a resin and the above-described flame retardant.

As examples of the resin, may be mentioned thermoplastic resins such as chlorinated polyethylene, polyethylene, polypropylene, polybutadiene, styrene-based resin, impact-resistant polystyrene, polyvinyl chloride, acrylonitrile-chlorinated polystyrene-styrene (ACS) resin, acrylonitrile-styrene (AS) resin, ABS resin, polyphenylene ether, modified polyphenylene ether, polymethacrylate, polyamide, polyester, polycarbonate, etc., and thermosetting resins such as polyurethane, phenolic resin, epoxy resin, melamine resin, urea resin, unsaturated polyester, etc. These resins may be used as a mixture of two or more thereof.

Among the above-mentioned resins, those not containing a halogen may be preferable.

In other words, it is possible to cope perfectly with the generation of halogen-containing toxic gases which may have various adverse effects by combining the flame retardant which does not contain a halogen with a resin which does not contain a halogen as well.

Polyurethane is particularly preferable among the resins not containing a halogen.

Polyurethane is produced by condensation reaction of a polyol with a diisocyanate. A flame retardant is used by dispersing it in a polyol. Since the flame retardant of the present invention is a liquid of low viscosity, the flame retardant can be uniformly dispersed in the polyol and furthermore can reduce the viscosity of the polyol, which is highly viscous intrinsically, thereby eliminating problems of sedimentation and dispersion failure.

Further, the flame retardant of the present invention can be automatically added at a constant addition rate to a resin material or during preparation of a resin composition for molding. A pre-mixture of the flame retardant and the polyol can be stored. Therefore, workability and storability are improved.

Since the flame retardant is uniformly blended in the obtained polyurethane, excellent flame retardancy is maintained for a long time.

The amount of the flame retardant blended in the resin composition of the present invention may be selected as appropriate depending upon the kind of a phosphoric ester (I), the kind of a resin, the use of a molded article of the resin composition and the performance (e.g., flame retardancy, etc.) required of the molded article.

The amount of the phosphoric ester (I) blended as a flame retardant may typically be 0.05 parts by weight or more, preferably 0.1 to 50 parts by weight, more preferably 5 to 20 parts by weight, with respect to 100 parts by weight of the resin. If the blend amount of the phosphoric ester (I) is less than 0.05 parts by weight, it is not preferable because the resin cannot be provided with sufficient flame retardancy. If the blend amount of the phosphoric ester (I) is more than 50 parts by weight, it is not preferable because it may cause a decline in properties of the resin. In the case where the resin is polyurethane, the flame retardant may preferably be added in the step of producing polyurethane. As regards the blend amount of the flame retardant in this case, the phosphoric ester (I) may be blended in an amount within the above-mentioned range with respect to 100 parts by weight of the total amount of a polyol and a diisocyanate, which are starting materials.

Other additives for resins may be blended, if necessary, in the resin composition of the present invention so long as the blending of the additives does not impair the properties of the resin to which the flame retardancy should be given.

As such additives for resins, may be mentioned other flame retardants than the phosphoric ester (I), antioxidants, inorganic fillers, antistatics, ultraviolet absorbers, lubricants and the like.

As the flame retardants other than the phosphoric ester (I), may be mentioned organic phosphorus compounds such as trimethyl phosphate, triethyl phosphate, tributyl phosphate, triphenyl phosphate, tricresyl phosphate, cresyldiphenyl phosphate, tri-2-ethylhexyl phosphate, etc.; nitrogen-containing compounds such as melamine, benzoguanamine, urea, ammonium polyphosphate and ammonium pyrophosphate; metal compounds such as aluminum hydroxide, magnesium hydroxide, zinc borate, etc.; and the like.

As the antioxidants, may be mentioned phosphorus compounds such as trivalent phosphorous compounds including triphenyl phosphite, tris(nonylphenyl)phosphite, diphenylisodecyl phosphite, bis(2,4-di-tert-butylphenyl) pentaerythritol diphosphite, tetrakis(2,4-di-tert-butylphenyl)-4,4-diphenylene phosphonite, etc.; hydroquinone compounds such as hydroquinone, 2,5-di-tert-butylhydroquinone, octylhydroquinone, 2,5-tert-amylhydroquinone, etc.; phenol compounds; amine compounds; sulfur compounds; and the like.

As the inorganic fillers, may be mentioned mica, talc, alumina and the like.

As the antistatics, may be mentioned cationic surfactants, non-ionic surfactants and the like.

As the ultraviolet absorbers, may be mentioned benzophenone compounds, salicylate compounds, benzotriazole compounds and the like.

As the lubricants, may be mentioned fatty acid compounds, fatty amide compounds, ester compounds, alcohol compounds and the like.

For producing the resin composition of the present invention, there is no particular limitation on the order or method of blending the respective components.

For example, the resin composition may be produced by mixing, melting and kneading the flame retardant, the resin and other additives for resin, as required, using known methods. For mixing, melting and kneading, general-use apparatus such as a single-screw extruder, a double-screw extruder, a Banbury mixer, a kneader mixer and the like may be used singly or in combination.

If the resin is produced by bulk polymerization, the flame retardant may be added ① at the feeding of a monomer, ② at the last stage of bulk polymerization reaction or ③ at the molding of the resulting polymer.

The obtained resin composition can be further molded by a known method to obtain a molded product in a desired form, for example, a plate, sheet or film form.

The phosphoric ester (I) of the present invention may be produced, for example, by the method disclosed by U.S. Pat. No. 5,750,601 (however, a saturated aliphatic alcohol is used in place of phenol).

Now explanation is given of methods of producing the phosphoric ester (I) for reference.

(Production Method 1)

Phosphorus oxychloride is reacted with 0.9 to 1.2 mol (preferably, 0.95 to 1.05 mol) of a diol compound with respect to 1 mol of phosphorus oxychloride, to obtain a compound represented by the formula (II):

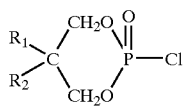

(II)

(wherein $R_1$ and $R_2$, the same or different, are an alkyl group having a carbon number of 1 to 6).

As the diol compound, a 2,2-dialkyl-1,3-propanediol is preferable. Examples thereof include 2,2-dimethyl-1,3-propanediol (=neopentyl glycol), 2-methyl-2-ethyl-1,3-propanediol, 2,2-diethyl-1,3-propanediol, 2,2-di-n-butyl-1,3-propanediol, 2,2-di-sec-butyl-1,3-propanediol, 2,2-di-tert-butyl-1,3-propanediol, 2-ethyl-2-n-butyl-1,3-propanediol, 2,2-di-n-pentyl-1,3-propanediol, 2,2-di-n-octyl-1,3-propanediol and the like, of which neopentyl glycol is the most preferable from the viewpoint of price and availability.

Since the produced compound (II) is solid, this reaction may preferably be carried out in an organic solvent in order to progress the reaction smoothly and avoid difficulty in handling the product owing to crystallization of the product.

Preferably, the organic solvent is inert, that is, the organic solvent does not involve a side reaction with phosphorus oxychloride, the diol compound and hydrogen chloride which is by-produced during the reaction.

Particularly, are preferable hydrocarbon solvents such as hexane, cyclohexane, haptane, octane, benzene, toluene, xylene, petroleum spirit, etc.; halogen-containing hydrocarbon solvents such as chloroform, carbon tetrachloride, 1,2-dichloroethane, trichloroethane, tetrachloroethane, chlorobenzene, dichlorobenzene, etc.; ether solvents such as diisopropyl ether, dibutyl ether, 1,4-dioxane, ethylene glycol diethyl ether, etc.; and the like, among which toluene, 1,2-dichloroethane and 1,4-dioxane are preferable, and 1,4-dioxane is particularly preferable.

The amount of the organic solvent used is not particularly limited, but may preferably be about 35 to 70 wt % with respect to the diol compound.

The reaction may preferably be carried out by stirring a mixture of the diol compound and the organic solvent and adding phosphorus oxychloride to the mixture.

The reaction temperature is 0 to 100° C., preferably 40 to 80° C. If the reaction temperature is lower than 0° C., it is not preferable because the reaction does not progress sufficiently. If the reaction temperature exceeds 100° C., it is not preferable because the produced product (II) decomposes and colors.

The reaction time is typically about 3 to 8 hours, though it may be varied depending upon conditions such as the reaction temperature.

By-produced hydrogen chloride can be removed by a known method, for example, a vacuum treatment such as nitrogen gas topping. The conditions of the vacuum treatment are preferably at such degrees that the organic solvent is not refluxed, and, for example, are a pressure within the range of 200 to 500 Torr at 40 to 90° C., preferably 50 to 80° C.

Subsequently, the compound (II) is reacted with a theoretical amount to a 20 wt % excess of the theoretical amount (preferably, an amount within the range of 10 to 15 wt % excess of the theoretical amount) of an alcohol to obtain the phosphoric ester (I).

The theoretical amount of the alcohol is calculated by the following formula:

The theoretical amount of the alcohol=(A×B×C)/(35.5×100)

(wherein A is the weight (g) of the compound (II), B is the chlorine content (wt %) in the compound (II) and C is the molecular weight of the alcohol).

If the amount of the alcohol used is less than the theoretical amount, the reaction is not completed. If the amount of the alcohol used exceeds 20 wt %, it is not economically preferable because an unreacted alcohol remains in a reaction system.

As the alcohol, may be mentioned methanol, ethanol, 1-propanol, 2-propanol, 1-butanol, sec-butanol, tert-butanol, hexanol, haptanol and octanol, among which 1-propanol and 1-butanol are particularly preferable.

This reaction may preferably be carried out in the presence of an acid-acceptor (for example, a base such as triethylamine, tributylamine or the like) for the purpose of reducing the reaction time and improving the purity of the product.

The amount of the acid-acceptor used is within the range of a theoretical amount to a 20 wt % excess of the theoretical amount, preferably within the range of 10 to 15 wt % excess of the theoretical amount.

The theoretical amount of the acid-acceptor is calculated by the following formula:

The theoretical amount of the acid-acceptor=(A×B×D)/(35.5×100)

(wherein A is the weight (g) of the compound (II), B is the chlorine content (wt %) in the compound (II) and D is the molecular weight of the acid-acceptor).

This reaction can be carried out continuously to the previous step reaction, particularly, by adding the alcohol or a mixture of the alcohol and the acid-acceptor while stirring the reaction product of the previous step containing the organic solvent.

The reaction temperature is 20 to 60° C., preferably 30 to 50° C. If the reaction temperature is lower than 20° C., it is not preferable because the reaction progresses very slowly. If the reaction temperature exceeds 60° C., it is not preferable because a side reaction may take place to cause adverse effects such as a decline in the purity of the product.

The reaction time is typically about 2 to 7 hours, though it may be varied depending upon conditions such as the reaction time.

Hydrogen chloride by-produced through this reaction is taken by the acid-acceptor to form a salt. This salt can be removed by washing the reaction mixture after the reaction is completed. More particularly, the obtained reaction mixture is collected from a reaction vessel and subjected to purification treatment such as washing and dehydration. For removing remaining water and low-boiling contents, it is preferable to carry out steam distillation as purification treatment.

(Production Method 2)

First, an alcohol is reacted with 1.0 to 5.0 mol (preferably, 1.1 to 3.0 mol) of phosphorus oxychloride with respect to 1 mol of the alcohol to obtain a compound represented by the formula (III):

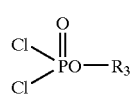

(III)

(wherein $R_3$ is an alkyl group having a carbon number of 1 to 20).

As the alcohol, may be mentioned the alcohol mentioned in the above described Production Method 1.

The reaction temperature is −20 to 50° C., preferably 10 to 20° C. If the reaction temperature is lower than −20° C., it is not preferable because the reaction does not progress sufficiently. If the reaction temperature exceeds 50° C., it is not preferable because the by-produced hydrogen chloride reacts with the alcohol to generate an alkyl chloride and water, which in turn decomposes the compound (III) and phosphorus oxychloride.

The reaction time is typically about 3 to 8 hours, though it may be varied depending upon conditions such as the reaction temperature.

By-produced hydrogen chloride can be removed by a known method, for example, a vacuum treatment such as nitrogen gas topping. The conditions of the vacuum treatment are, for example, a pressure within the range of 10 to 200 Torr at 0 to 20° C., preferably 5 to 10° C.

Since the compound (III) decomposes at about 50° C., the above-mentioned temperature conditions are preferably set at or below 50° C.

Unreacted phosphorus oxychloride remaining in a system is preferably removed after the reaction is completed because there are problems, for example, in that the unreacted phosphorus oxychloride will cause a side reaction with a diol compound in the next step reaction to decline the purity of the product.

Next, the compound (III) is reacted with a theoretical amount to a 20 wt % excess of the theoretical amount (preferably amount within the range of 10 to 15 wt % excess of the theoretical amount) of the diol compound to obtain the phosphoric ester (I).

The theoretical amount of the diol compound is calculated by the following formula:

The theoretical amount of the diol compound=(E×F×G)/[2×(35.5×100)]

(wherein E is the weight (g) of the compound (III), F is the chlorine content (wt %) in the compound (III) and G is the molecular weight of the diol compound).

Since the diol compound is solid, this reaction may preferably be carried out in an organic solvent in order to progress the reaction smoothly and avoid difficulty in handling the product owing to crystallization of the product.

As the diol compound and the organic solvent, may be mentioned those mentioned in the above-described Production Method 1. The amount of the organic solvent used is not particularly limited, by may preferably be 35 to 70 wt % with respect to the diol compound.

This reaction may preferably be carried out in the presence of an acid-acceptor similar to those of Production Method 1 for the purpose of reducing the reaction time and improving the purity of the product.

The amount of the acid-acceptor used is within the range of a theoretical amount to a 20 wt % excess of the theoretical amount, preferably within the range of 10 to 15 wt % excess of the theoretical amount.

The theoretical amount of the acid-acceptor is calculated by the following formula:

The theoretical amount of the acid-acceptor=(E×F×C)/(35.5×100)

(wherein E is the weight (g) of the compound (III), F is the chlorine content (wt %) in the compound (III) and C is the molecular weight of the alcohol).

The reaction temperature is 20 to 60° C., preferably 30 to 50° C. If the reaction temperature is lower than 20° C., it is not preferable because the reaction progresses very slowly. If the reaction temperature exceeds 60° C., it is not preferable because a side reaction may take place to cause adverse effects such as a decline in the purity of the product.

The reaction time is typically about 2 to 7 hours, though it may be varied depending upon conditions such as the reaction temperature.

Hydrogen chloride by-produced through this reaction is taken by the acid-acceptor to form a salt. This salt can be removed by washing the reaction mixture after the reaction is completed. More particularly, the obtained reaction mixture is collected from a reaction vessel and subjected to purification treatment such as washing and dehydration. For removing remaining water and low-boiling contents, it is preferable to carry out steam distillation as purification treatment.

EXAMPLES

The present invention is now explained in further detail with reference to production examples and examples, which however are not intended to limit the scope of the invention. In the examples, "a part or parts" means "a part or parts by weight" unless otherwise indicated.

Production Example 1

In a four-necked 1-L flask provided with a stirrer, a thermometer, a dropping funnel and a condenser connected to a water scrubber, 204.0 g (2.0 mol) of neopentyl glycol and 102.0 g of 1,4-dioxane (50 wt % with respect to neopentyl glycol) were fed and stirred. Subsequently, the resulting mixture was heated to 50° C. using a thermostatic device. With maintaining this temperature, 307.0 g (2.0 mol) of phosphorus oxychloride was added in three hours through the dropping funnel. After addition, the reaction mixture was stirred at 50° C. for two hours, and further the reaction mixture was heated to 75° C. in an hour. Subsequently, by-produced hydrogen chloride was removed at a vacuum degree of 250 Torr at 75° C. in two hours, to obtain 471.0 g of Compound (II) wherein $R_1$ and $R_2$ were methyl. The chlorine content in this compound was 15.07%.

Subsequently, the above reaction mixture was cooled to 50° C. With maintaining this temperature, 354.1 g of a mixed solution of 222.1 g (2.2 mol) of triethylamine and 132.0 g (2.2 mol) of 1-propanol were added to the reaction mixture in two hours. After addition, the reaction mixture was stirred for three hours with maintaining its temperature at 50° C.

The obtained reaction mixture was washed with water to remove triethylamine hydrochloride. Further water and low-boiling contents were removed by heating under vacuum, to give 395.2 g of a pale yellow liquid.

The obtained product was elementally analyzed and its viscosity was measured.

The obtained product was a Compound (1) having the following chemical structure.

Table 1 shows the results of elemental analysis and theoretical values, the viscosity and the yield of the product.

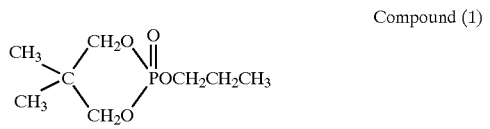

Compound (1)

Production Example 2

A pale yellow liquid, 421.8 g, was obtained in the same manner as described in Production Example 1 except that 162.8 g (2.2 mol) of 1-buthanol were used in place of 1-propanol.

The obtained product was elementally analyzed and its viscosity was measured in the same manner as described in Production Example 1.

The product is a Compound (2) having the following chemical structure.

Table 1 shows the results of elemental analysis and theoretical values, the viscosity and the yield of the product.

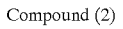

Compound (2)

TABLE 1

| | Composition<br>Upper: Analytic results<br>Lower: Theoretical values | | | Viscosity | Yield |
|---|---|---|---|---|---|
| | P % | C % | H % | (cps/25° C.) | (%) |
| Compound (1) | 14.88<br>14.90 | 46.14<br>46.15 | 8.16<br>8.17 | 21 | 95.0 |
| Compound (2) | 13.94<br>13.96 | 48.63<br>48.65 | 8.54<br>8.56 | 26 | 95.0 |

In the following examples, performance evaluation was carried out on Compound (1) and Compound (2), which were flame retardants in accordance with the present invention, as well as a Compound (A) and a Compound (B), which were known flame retardants not containing a halogen as comparative examples.

Compound (A): triethyl phosphate
Compound (B): cresyldiphenyl phosphate

Example 1 (Evaluation of Flame Retardants on Resistance to Hydorlysis)

Compound (1) and Compound (2), where were obtained in Production Example 1 and Production Example 2, respectively, Compound (A) and Compound (B) were measured for their acid values as evaluation of resistance to hydrolysis in accordance with ASTM D-2169 and MIL III-19457.

In a pressure-resistant sample bottle, 75 g of each compound to be measured and 25 g of distilled water were fed as samples, and the bottle was capped tightly. Then the pressure-resistant sample bottle was attached to a hydrolyzing apparatus (which has the function of rotating five times in a minute to mix the contents of a sample bottle) adjusted to 93° C. beforehand, maintained at the same temperature for 48 hours and cooled to room temperature.

The mixture in the pressure-resistant sample bottle was moved into a separatory funnel and allowed to stand, and an aqueous phase was collected. Subsequently, about 100 g of distilled water were added as washing water to an oily phase, gently oscillated and allowed to stand, and an aqueous phase was collected. This aqueous phase separated was mixed with the first aqueous phase. Washing was repeated in the same manner until washing water became neutral.

The total acid value of all aqueous phases collected (including washing water) was measured.

Table 2 shows the results obtained about each of the compounds.

TABLE 2

| Flame retardant | Total acid value (KOH mg/g) |
|---|---|
| Compound (1) | 32 |
| Compound (2) | 27 |
| Compound (A) | 837 |
| Compound (B) | 0.2 |

Example 2 (Production of Flame-retarded Flexible Polyurethane Foams)

Components to be blended

Polyol (Tradename: MN-3050 ONE, produced by Mitsui Chemicals, Inc.) 100 parts
Diisocyanate (Tradename: TDI 80/20, produced by Mitsui Chemicals, Inc.) 59.5 parts
Silicone oil (Tradename: F-242T, produced by Shin-Etsu Chemical Co., Ltd.) 1.2 parts
Tin-based catalyst (Tradename: STANN BL, produced by Sankyo Organic Chemicals Co., Ltd.) 0.3 parts
Amine-based catalyst (Tradename: Kaolizer No. 1, produced by Kao Corporation) 0.1 parts
Water 5.0 parts
Dichloromethane 5.0 parts Each of the flame retardants (in an amount with respect to 100 parts by weight of the total amount of the polyol and diisocyanate, shown in Table 3)

With use of the above-mentioned components, flexible urethane foams were produced by a one-shot process as described below.

First, the polyol, silicone oil, catalysts, dichloromethane, water and flame retardant were blended and uniformly mixed by stirring for a minute by a stirrer at a revolution rate of 3000 rpm. Subsequently, the diisocyanate was added and the resulting mixture was further stirred for 5 to 7 seconds at a revolution rate of 3000 rpm. Subsequently the resulting mixture was poured quickly into a board-carton box of square cross section. The mixture started foaming immediately and reached the maximum volume after several minutes. This foamed product was cured for 30 minutes in an oven at 80° C. The resulting foamed product had a cellular structure of white flexible foam type.

Example 3 (Production of Flame-retarded Rigid Polyurethane Foams)

Polyol (Tradename: SU-464, produced by Mitsui Chemicals, Inc.) 100 parts
Diisocyanate (Tradename: M-200, produced by Mitsui Chemicals, Inc.) 192.2 parts
Silicone oil (Tradename: SH-193, produced by Dow Corning Toray Silicone Co., Ltd.) 2.0 parts
Tin-based catalyst (Tradename: STANN BL, produced by Sankyo Organic Chemicals Co., Ltd.) 0.1 parts
Amine-based catalyst (Tradename: Kaolizer No. 3, produced by Kao Corporation) 0.7 parts
Water 5.0 parts
Each of the flame retardants (in an amount with respect to 100 parts by weight of the total amount of the polyol and diisocyanate, shown in Table 4)

With use of the above-mentioned components, rigid urethane foams were produced by a one-shot process as described below.

First, the polyol, silicone oil, catalysts, water and flame retardant were blended and uniformly mixed by stirring for a minute by a stirrer at a revolution rate of 3000 rpm. Subsequently, the diisocyanate was added and the resulting mixture was further stirred for 5 to 7 seconds at a revolution rate of 3000 rpm. Subsequently, the resulting mixture was poured quickly into a board-carton box of square cross section. The mixture started foaming immediately and reached the maximum volume after several minutes. The resulting foamed product had a cellular structure of white rigid foam type.

Example 4 (Performance Evaluation of Flame-retarded Flexible Polyurethane Foams)

The flame-retarded flexible polyurethane foams obtained in Example 2 were determined for their properties in accordance with the following standards or by the following operation.

① Density ($kg/m^3$): determined in accordance with JIS K-7222

② 25% hardness (kgf): determined in accordance with JIS K-6401

③ Flame retardancy: evaluated in accordance with FMVSS-302 (Flame retardancy test for flexible polyurethane foams)

Evaluation criteria:

NB: self-extinguished within a marked line A (38 mm from an ignition point)

SE: self-extinguished within a range from the marked line A to a marked line B (38 to 292 mm from the ignition point)

BN: burned over the marked line B (292 mm from the ignition point)

④ Susceptibility to discoloration

A test piece (5×5×1 $cm^3$) was put in a thermostatic chamber at 120° C. and maintained for 24 hours. Thereafter, the degree of discoloration (YI) of the test piece was determined for indicating the susceptibility to discoloration using a calorimeter.

The obtained results are shown in Table 3

TABLE 3

| Evaluation No. | Flame retardant | Use amount* (parts) | Density ($kg/m^3$) | 25% hardness (kgf) | Flame retardancy | Susceptibility to discoloration (YI) |
|---|---|---|---|---|---|---|
| 1 | Compound (1) | 5.6 (9) | 25 | 10 | NB | 30 |
| 2 | Compound (2) | 6.3 (10) | 25 | 10 | NB | 30 |
| 3 | Compound (A) | 6.3 (10) | 25 | 10 | SE | 80 |
| 4 | Compound (B) | 6.3 (10) | 25 | 10 | BN | 30 |

*Blended amount with respect to 100 parts by weight of the total amount of the polyol and diisocyanate (blended amount with respect to 100 parts by weight of the polyol)

Example 5 (Performance Evaluation of Flame-retarded Rigid Polyurethane Foams)

The flame-retarded rigid polyurethane foams obtained in Example 3 were determined for their properties in accordance with the following standards or by the following operation.

① Density ($kg/m^3$): determined in accordance with JIS K-7222

② Flexural strength ($kgf/cm^2$): determined in accordance with JIS K-7220

③ Flame retardancy: evaluated in accordance with JIS A-9514 (Testing method for flame retardancy of rigid polyurethane foams)

The obtained results are shown in Table 4

TABLE 4

| Evaluation No. | Flame retardant | Use amount* (parts) | Density ($kg/m^3$) | Flexural strength ($kgf/cm^2$) | Flame Retardancy (mm) |
|---|---|---|---|---|---|
| 5 | Compound (1) | 3.4 (10) | 32 | 2 | 36.7 |
| 6 | Compound (2) | 4.1 (12) | 32 | 2 | 38.6 |
| 7 | Compound (A) | 2.7 (8) | 32 | 2 | 39.6 |
| 8 | Compound (B) | 4.1 (12) | 32 | 2 | Burned out |

*Blended amount with respect to 100 parts by weight of the total amount of the polyol and diisocyanate (blended amount with respect to 100 parts by weight of the polyol)

The results in Table 3 and Table 4 show the following:

① The flame retardants of the present invention, added to the resin in a smaller amount as compared with the prior-art flame retardants not containing a halogen, can provide excellent flame retardancy to the resins without declining the intrinsic properties of the resins.

② The resin compositions (polyurethane foams) of the present invention are excellent in the resistance to discoloration.

Generally, the discoloration (coloration) of resin compositions is considered to be due to compounds generated when flame retardants themselves hydrolyze. It is therefore considered that the excellent resistance to hydrolysis of the flame retardants of the present invention contributes to suppression of the discoloration of the resin compositions.

The flame retardancy of the present invention, when mixed with various resins, can provide excellent flame retardancy to the resins without declining the intrinsic properties of the resins. Further, since the flame retardancy of the present invention does not contain a halogen and does not generate toxic gases during the molding or burning of the resins, the flame retardant does not put loads on the environment or does not affect human bodies adversely.

Furthermore, the flame retardant of the present invention is a liquid of low viscosity at room temperature, disperses well in resins and exhibits good compatibility especially to polyurethane. In addition, since it is excellent in the resistance to hydrolysis, the flame retardant of the invention does not discolor resin compositions and does not decline durability.

The resin composition of the present invention can be suitably used for domestic electric appliances such as VTRs, distribution boards, television sets, air conditioners, etc., OA equipment including personal computers, printers, facsimile machines, telephones, etc., electric devices such as connectors, switches, motor components, etc., automobile components such as console boxes, seat cushions, etc., construction materials and the like.

What is claimed is:

1. A method of imparting flame retardance to at least one resin comprising adding to said resin a compound containing a phosphoric ester represented by the formula (I):

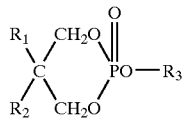

(I)

wherein $R_1$ and $R_2$, the same or different, are an alkyl group having a carbon number of 1 to 6 and $R_3$ is an alkyl group having a carbon number of 1 to 20, and wherein the resin comprises a polyurethane resin.

2. A method as set forth in claim 1, wherein $R_1$ and $R_2$ in the formula (I) are straight-chain or branched alkyl groups having a carbon number of 1 to 4.

3. A method as set forth in claim 1, wherein $R_3$ in the formula (I) is a straight-chain or branched alkyl group having a carbon number of 1 to 4.

4. A flame retardant for resins as set forth in claim 1, wherein $R_1$ and $R_2$ in the formula (I) are methyl groups and $R_3$ is a n-propyl or n-butyl group.

5. A flame-retarded resin composition comprising a resin and a flame retardant for resins as set forth in claim 1.

6. A flame-retarded resin composition as set forth in claim 5, wherein the resin does not contain a halogen.

7. A flame-retarded resin composition as set forth in claim 5, wherein 0.1 to 50 parts by weight of the flame-retardant is blended therein with respect to 100 parts by weight of the resin.

8. A method as set forth in claim 2, wherein $R_3$ in the formula (I) is a straight-chain or branched alkyl group having a carbon number of 1 to 4.

9. A flame-retarded resin composition comprising a resin and a flame retardant for resins as set forth in claim 2.

10. A flame-retarded resin composition as set forth in claim 9, wherein the resin does not contain a halogen.

11. A flame-retarded resin composition as set forth in claim 6, wherein 0.1 to 50 parts by weight of the flame-retardant is blended therein with respect to 100 parts by weight of the resin.

12. A flame-retarded resin composition as set forth in claim 1, wherein 0.1 to 50 parts by weight of the flame-retardant is blended therein with respect to 100 parts by weight of the resin.

13. A flame-retarded resin composition as set forth in claim 12, comprising a mixture of two or more species of formula (I).

14. A flame-retarded resin composition as set forth in claim 12, further comprising one or more additives selected from trimethyl phosphate, triethyl phosphate, tributyl phosphate, triphenyl phosphate, tricresyl phosphate, cresyl-diphenyl phosphate, tri-2-ethylhexyl phosphate.

* * * * *